US007742944B2

(12) United States Patent
Dicker et al.

(10) Patent No.: US 7,742,944 B2
(45) Date of Patent: Jun. 22, 2010

(54) METHOD FOR SELECTING RELEVANT CAMPAIGN MESSAGES FOR TRANSMISSION TO RECIPIENTS

(75) Inventors: Russell Dicker, Seattle, WA (US); Andrew Harbick, Shoreline, WA (US); John Benjamin Compton, Renton, WA (US); Matt Round, Mercer Island, WA (US); Alexander Prater, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1546 days.

(21) Appl. No.: 10/387,225

(22) Filed: Mar. 10, 2003

(65) Prior Publication Data
US 2004/0204989 A1    Oct. 14, 2004

(51) Int. Cl.
     *G06Q 30/00*    (2006.01)
(52) U.S. Cl. .............. 705/14.46; 705/14.52; 705/14.66
(58) Field of Classification Search .................... 707/3; 345/751; 705/14, 14.46, 14.52, 14.66
See application file for complete search history.

(56) References Cited

U.S. PATENT DOCUMENTS

| | | | |
|---|---|---|---|
| 5,835,087 A | 11/1998 | Herz et al. | |
| 6,064,980 A * | 5/2000 | Jacobi et al. | 705/26 |
| 6,362,837 B1 * | 3/2002 | Ginn | 715/751 |
| 6,567,786 B1 * | 5/2003 | Bibelnieks et al. | 705/14 |
| 6,810,394 B2 * | 10/2004 | Coutts et al. | 707/3 |
| 7,010,497 B1 * | 3/2006 | Nyhan et al. | 705/14 |
| 7,370,002 B2 * | 5/2008 | Heckerman et al. | 705/10 |
| 2001/0002469 A1 | 5/2001 | Bates et al. | |
| 2004/0002932 A1 | 1/2004 | Horvitz et al. | |
| 2004/0103017 A1 | 5/2004 | Reed et al. | |
| 2004/0204989 A1 * | 10/2004 | Dicker et al. | 705/14 |
| 2008/0120155 A1 * | 5/2008 | Pliha | 705/7 |

OTHER PUBLICATIONS

"E.piphany Marketing Product Line," *E.piphany*, n.d., <http://www.epiphany.com/products/cme.html>, available at least as early as Feb. 24, 2003.
Sightward, Inc., "Boosting Response Rates with Predictive Analytics," *White Paper*, 2002, pp. 1-9.
Sightward, Inc., "Limitations of RFM in Customer Targeting," *White Paper*, 2002, pp. 1-8.
"Sightward's Customer Centric Reports and Forecasting Accuracy Help Direct Marketers Maximize ROI," *internet retailer*, Nov. 4, 2002, pp. 1-2.

* cited by examiner

*Primary Examiner*—Donald L Champagne
(74) *Attorney, Agent, or Firm*—Christensen O'Connor Johnson Kindness PLLC

(57) ABSTRACT

The present invention is directed to automating the sending of campaign messages in computing environments. Campaign scores are determined for messaging campaigns and eligible recipients are assigned to campaigns with a higher score. More specifically, eligible recipients are assigned to a particular messaging campaign if the campaign is the "best" campaign for each eligible recipient based on the campaign score. Additionally, a portion of the eligible recipients are reserved as a control group for each campaign. After campaign messages have been sent out to assigned recipients, the behavior of the recipients who received campaign messages and the behavior of the control group members are differentiated to update the campaign's score. Continually updating campaign scores makes it possible to continually update which campaign is best for a particular recipient.

31 Claims, 11 Drawing Sheets

METHOD FOR SELECTING RELEVANT CAMPAIGN MESSAGES FOR TRANSMISSION TO RECIPIENTS

FIELD OF THE INVENTION

The present invention relates in general to on-line message communications and in particular to a system and method for automating the sending of e-mails to designated recipients.

BACKGROUND OF THE INVENTION

Communication networks are well known in the computer communications field. By definition, a network is a group of computers and associated devices that are connected by communications facilities or links. An internetwork, in turn, is the joining of multiple computer networks, both similar and dissimilar, by means of gateways or routers, that facilitate data transfer and conversion from various networks. A well-known abbreviation for the term internetwork is "internet." As currently understood, the capitalized term "Internet" refers to the collection of networks and routers that use the Internet Protocol ("IP"), to communicate with one another. The Internet has recently seen explosive growth by virtue of its ability to link computers located throughout the world. As will be appreciated from the following description, the present invention could find use in many interactive environments; however, for purposes of discussion, the Internet is used as an exemplary interactive environment for implementing the present invention.

The Internet has quickly become a popular method of disseminating information due in large part to its ability to deliver information quickly and reliably. To send a document or other data over the Internet, a user typically uses communications software. A common way of addressing a document is through an e-mail address that provides the location of an individual with an e-mail account on a server connected to the Internet.

A drawback of using e-mail to communicate with individuals has been the lack of consideration for the amount of e-mail sent to a particular recipient. If a particular recipient met the criteria for receiving a multitude of different e-mail, there was no method of limiting the quantity of e-mail received by the recipient. This lack of "inbox control" led to both disillusionment on behalf of recipients who received too much e-mail and on behalf of campaign message senders whose e-mails were not given the desired consideration they might have received if fewer messages had been sent.

Accordingly, there is a need for a method of automatically controlling the sending of campaign messages (mail) to different groups of recipients that does not require regular operator intervention, that is stable, and that supports an "inbox management" mechanism for limiting how many campaign messages are sent to a particular recipient.

SUMMARY OF THE INVENTION

The present invention is directed to automating the sending of campaign messages in computing environments. In accordance with one aspect of the invention, messaging campaigns are assigned campaign scores that are used to assign eligible recipients to receive campaign messages. More specifically, eligible recipients are assigned to a particular messaging campaign according to the campaign's score. Additionally, a portion of the eligible recipients are reserved as a control group for each campaign and are not sent campaign messages. After campaign messages have been sent to assigned recipients, the behavior of the recipients who received campaign messages and the behavior of the control group members are differentiated to update the campaign's score. Continually updating campaign scores makes it possible to continually determine which campaign is best for a particular recipient.

In accordance with other aspects of this invention, campaigns do not initially start with a campaign score. Instead, the campaign is designated a testing campaign and eligible recipients are assigned to the testing campaign. Additionally, a portion of the eligible testing campaign recipients are reserved as a test control group. The testing campaign messages are then sent to the recipients that have been assigned to the testing campaign and the actions of the assigned recipients and test control group members are differentiated so as to arrive at a campaign score for the testing campaign. Once a testing campaign has a score, the testing campaign becomes a regular campaign where recipients are assigned to the campaign based on the campaign's score.

In accordance with still further aspects of the present invention, the campaign scores are calculated from metrics representing the actions of campaign message recipients and control group members.

In accordance with yet further aspects of the present invention, the determination of which campaign to assign a particular recipient includes analyzing campaigns in a lookahead period to determine if a campaign in the future is better for a particular recipient than a campaign in the present planning period.

In accordance with another aspect of the present invention, inbox data is maintained on how often a recipient receives messages from a particular kind of campaign. The inbox data is used to ensure that a recipient does not receive too many messages from campaigns implemented in accordance with the present invention.

As will be readily appreciated by those skilled in this art and others, from the foregoing summary, the invention efficiently analyzes both campaign and recipient data to automate the sending of campaign messages. Accordingly, it will also be appreciated from the foregoing summary that the invention provides a new and improved method, system, and computer readable medium for automating the sending of campaign messages.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description which follows is represented largely in terms of processes and symbolic representations of operations by conventional computer components, including a processor, memory storage devices for the processor, connected display devices, and input devices. Each of these processes and operations may utilize conventional computer components in a heterogeneous distributed computing environment, including remote file servers, computer servers and memory storage devices. Each of these conventional distributed computing components is accessible by the processor via a communication network.

Figure 1:
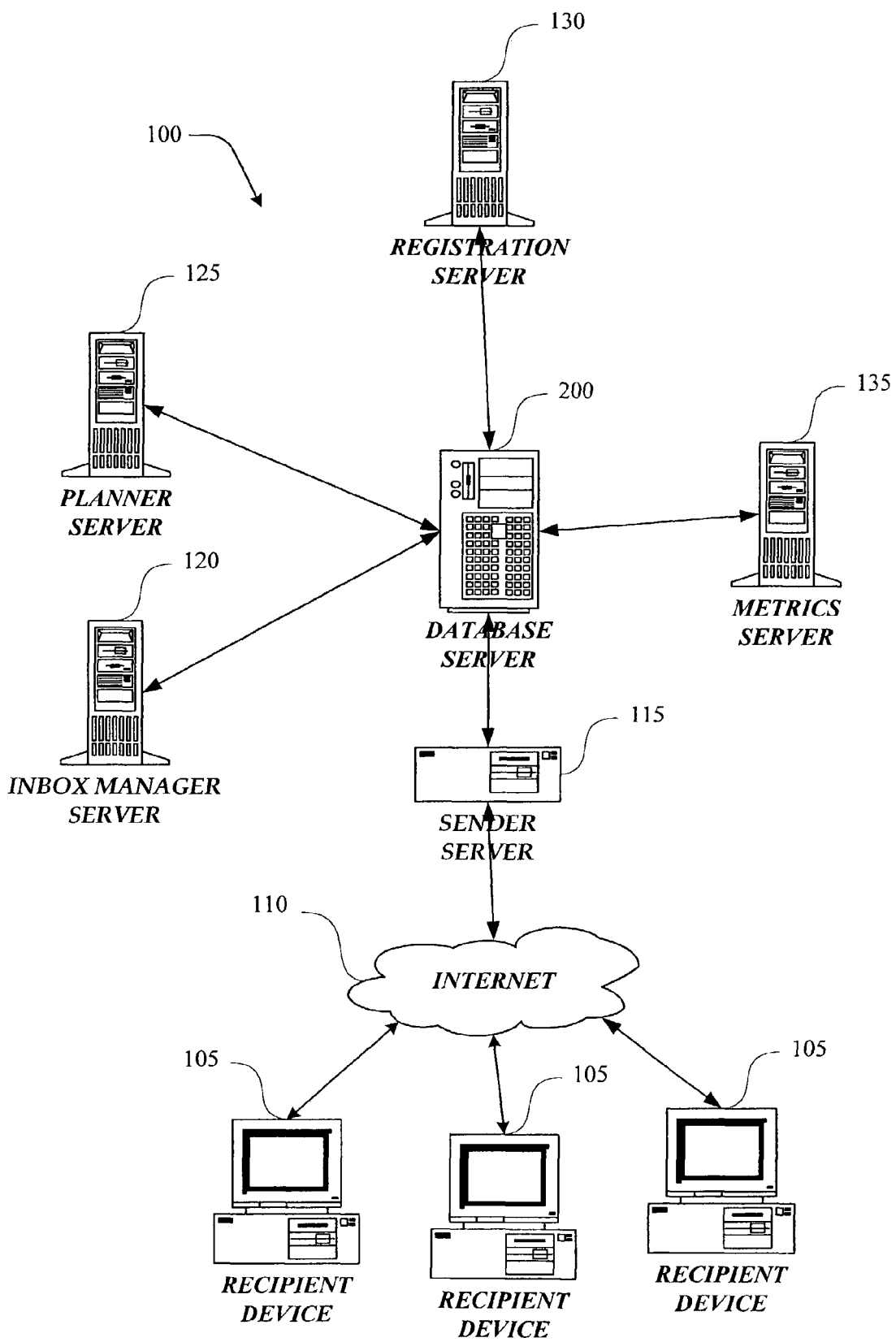
FIG. 1 is a pictorial diagram of a number of devices connected to a network which coordinate to send e-mail messages to recipient devices in accordance with the present invention.

FIG. 1 illustrates a pictorial diagram of a system 100 for automating the sending of campaigns messages. The system 100 shown in FIG. 1 includes a sender server 115, an inbox manager server 120, a planner server 125, a registration server 130, a metrics server 135, and a database server 200, all interconnected over one or more networks. Campaign messages are sent to recipient devices 105 over the internet 110. While the system 100 generally operates in a distributed computing environment comprising individual computer systems interconnected over one or more networks, it will be appreciated by those of ordinary skill in the art and others that the system 100 could equally function as a single stand-alone computer system, or on more or fewer computer systems than are illustrated in system 100. Thus, the system shown in FIG. 1 should be taken as exemplary, not limiting.

The sender server 115 is responsible for sending campaign messages to recipients at recipient devices 105 via a simplified representation of the Internet 110. Those of ordinary skill in the art and others will appreciate that the sender server 115 may send out campaign messages in a variety of formats. Such formats may include, but by no means are limited to, electronic mail messages, short message services (SMS) messages, wireless application protocol (WAP) messages, instant messenger messages and audio messages. Those of ordinary skill in the art and others will appreciate that a variety of sender servers 115, or similar devices, may be used by the present invention for sending campaign messages.

The inbox manager server 120 manages inbox data 270 to regulate how often recipients may receive campaign messages in accordance with the present invention. The planner server 125 coordinates with the other devices of the system 100 for automating the sending of campaign messages. The registration server 130 is used to gather registration information for campaigns, in particular for new campaigns. The metrics server 135 gathers metrics information on the actions and behavior of recipients and potential recipients of campaign messages.

As noted above, FIG. 1 should be taken as exemplary and not limiting. It will be appreciated by those of ordinary skill in the art and others that the routines and responsibilities of any of the illustrated computing devices in FIG. 1 may be combined with the routines and responsibilities of other servers to reduce the number of computing devices. Additionally, the routines and responsibilities of the illustrated computing devices may be shared with similar devices for parallel processing or may be divided into still more computing devices for a decreased load on any one device.

Figure 2:
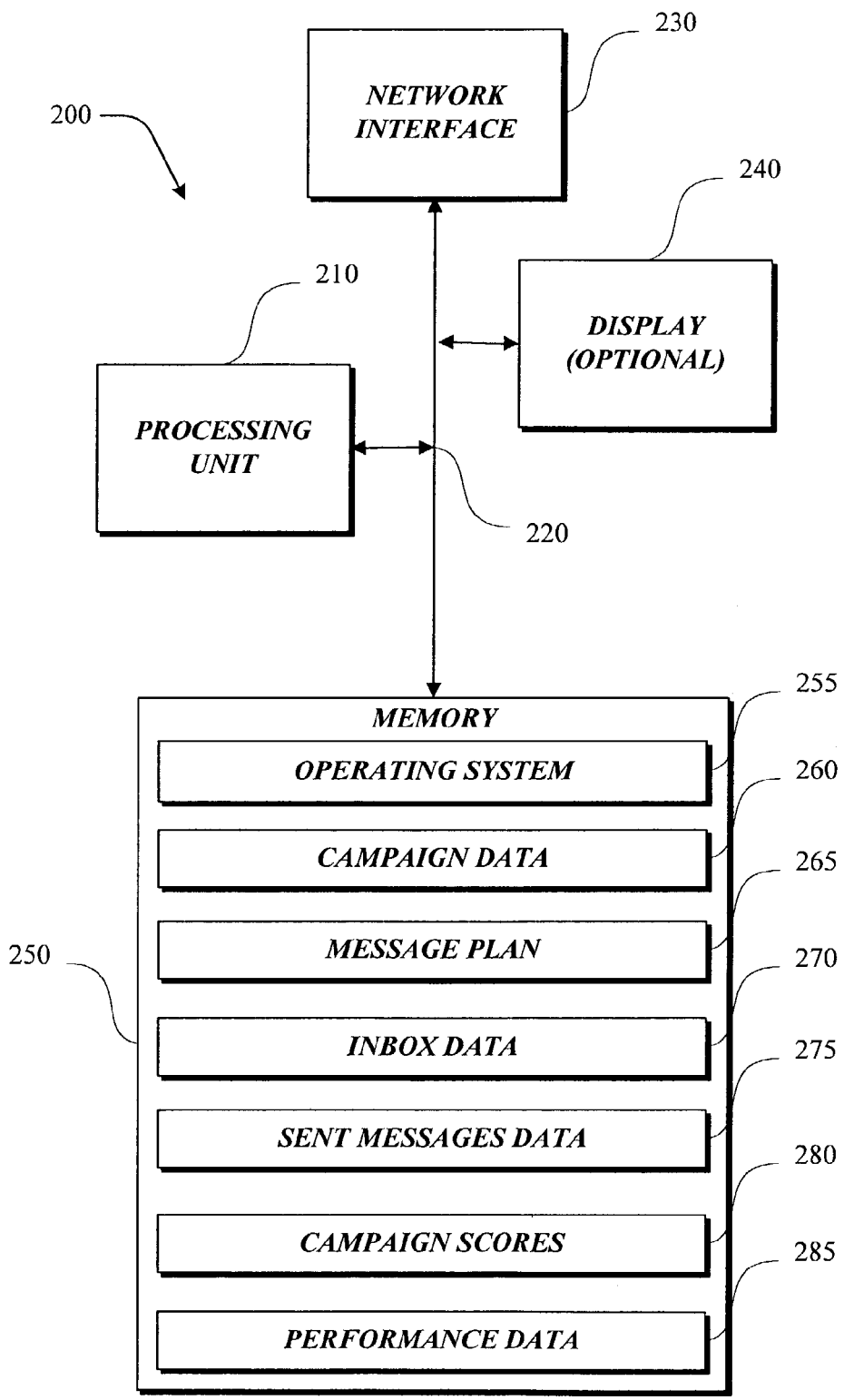
FIG. 2 is a block diagram of a database server that includes a memory.

FIG. 2 depicts several of the key components of the database server 200. Those of ordinary skill in the art will appreciate that the database server 200 may include many more components than those shown in FIG. 2. However, it is not necessary that all of these generally conventional components be shown in order to disclose an enabling embodiment for practicing the present invention. As shown in FIG. 2, the database server 200 includes an input/output ("I/O") network interface 230 for connecting to other devices (not shown).

The database server 200 also includes a processing unit 210, an optional display 240, and a memory 250 all interconnected along with the I/O interface 230 via a bus 220. The memory 250 generally comprises a random access memory ("RAM"), a read-only memory ("ROM"), and a permanent mass storage device, such as a disk drive, tape drive, optical drive, floppy disk drive, or combination thereof. The memory 250 stores an operating system 255, campaign data 260 (containing information for creating campaign messages as well as parameters for each campaign), message plan 265 (containing recipient and campaign message pairs to be sent during a current planning period), inbox data 270 (containing information on how often each recipient may receive campaign messages), sent messages data 275 (a record of which messages have been sent, and to which recipients), campaign scores 280 (a record of the current score for each campaign that has a score), and performance data 285 (a stored copy of performance metrics for campaign message recipients' metrics as well as control group members' metrics). It will be appreciated that these software data components may be loaded from a computer-readable medium into the memory 250 of the database server 200 using a drive mechanism (not shown) associated with the computer readable medium, such as a floppy, tape, or DVD/CD-ROM drive, or via the I/O network interface 230.

Before addressing specific aspects and routines of the present invention illustrated in the drawings, an overview of the invention is described. The present invention automates the sending of campaign messages. However, before the campaign messages that make up a campaign may be sent out, the campaign must first be created. The creation of campaigns takes place via a campaign registration routine such as campaign registration routine 300 illustrated in FIG. 3 and described below. Once the necessary information to register a campaign has been received and stored for processing, the campaign creator's job is done. The present invention is able to handle the processing, analysis and sending of the now registered campaign with no (or at least minimal) operator intervention.

The automated campaign sending system of the present invention is flexible enough to handle campaigns that recipients have subscribed to, as well as campaigns that will be dynamically assigned to particular recipients based on both the campaigns' parameters and the recipients' characteristics. For example, if a campaign is registered to notify all purchasers of an author's first book that a second book by the same author had just been published, then it could be said that the recipients' characteristic of having purchased the first book by the author is one criteria that might match them to a particular campaign. However, the present invention incorporates the recognition that it is undesirable to send too many campaign messages to any one recipient. Accordingly, if there are recipients who qualify based on their recipient characteristics to receive more than one campaign, the present invention ranks campaigns with a score so that only the campaign with the most perceived value (i.e., the highest score) is sent to the recipient.

When a campaign is first registered it will not have a score as there has been no way to test its value with recipients. Accordingly, when a campaign is first registered, it goes through a testing phase during which a test campaign message is sent out to a statistically large enough group of recipients and the behavior of the recipients is compared to a control group of individuals who were also eligible to receive the test campaign message but were not sent the test campaign message. By analyzing the differences in behavior and responses of the recipients who were sent a campaign message and those that were not, it is possible to score the campaign by deriving a set of metrics for the campaign. These metrics, when analyzed and processed, produce a campaign score for the test campaign message. Once a campaign message has been scored, it can be ranked against other "active" campaigns that also have scores.

In an alternate embodiment of the present invention, campaigns are grouped by type of campaign and campaigns of the same type share a campaign score. This allows new campaigns of the same type as a previously scored campaign to immediately transition into an "active" mode once they are registered, without having to be tested first.

A daily analysis of which campaigns to send involves sending out any campaigns that recipients have subscribed to, sending out any testing campaigns (those campaigns whose campaign scores are either nonexistent or are not considered), sending any other types of campaigns such as partner campaigns (third party campaigns that may be sent for remuneration from a third party partner) and sending out any active merchandising campaigns that have been ranked and for which recipients have been assigned. The assignment of recipients to campaigns in the present invention aims to balance the sending of higher ranked (more desirable) campaign messages, while not overburdening recipients with too many campaign messages.

I. Creation and Registration of Campaigns

For purposes of clarity, campaigns will be generalized to fall within one of two types: mandatory or discretionary. Those of ordinary skill in the art and others will appreciate that other kinds of campaigns may be compatible with and incorporated into the campaign sending system of the present invention.

Mandatory campaigns are those campaigns where the campaign sender is required (either contractually or otherwise) to send out the campaign to a certain group of recipients within a certain period of time. An example of a mandatory campaign is a subscription campaign where a recipient has requested to receive a periodic e-mail, such as by signing up on an opt-in mailing list. Another example of a mandatory campaign is a partner campaign sent on behalf of a partner to a certain number of recipients for a set price.

Discretionary campaigns are those campaigns where the campaign operator has discretion over the number of messages that are sent out and the timing of the campaign. An example of a discretionary campaign is a merchandising campaign offering the sale of a new product to a customer. Another example of a discretionary campaign is a testing campaign used to determine a new campaign score for a campaign (or campaign type).

Each campaign is defined by, and may include, one or more of the following parameters:

(1) Campaign type, corresponding to a template for a type of message (e.g., a new product announcement message, a shipping promotion message, etc.).

(2) Contents to include in campaign messages (e.g., graphics and text) or a reference for gathering contents (e.g., an inventory number referenced to a product database where the image and description of the product is stored).

(3) Identity of all recipients to which the campaign is to be sent (e.g., a list of all recipients or a description of the type of recipients that are to receive the campaign).

(4) Dates during which the campaign is to be sent.

Figure 3:
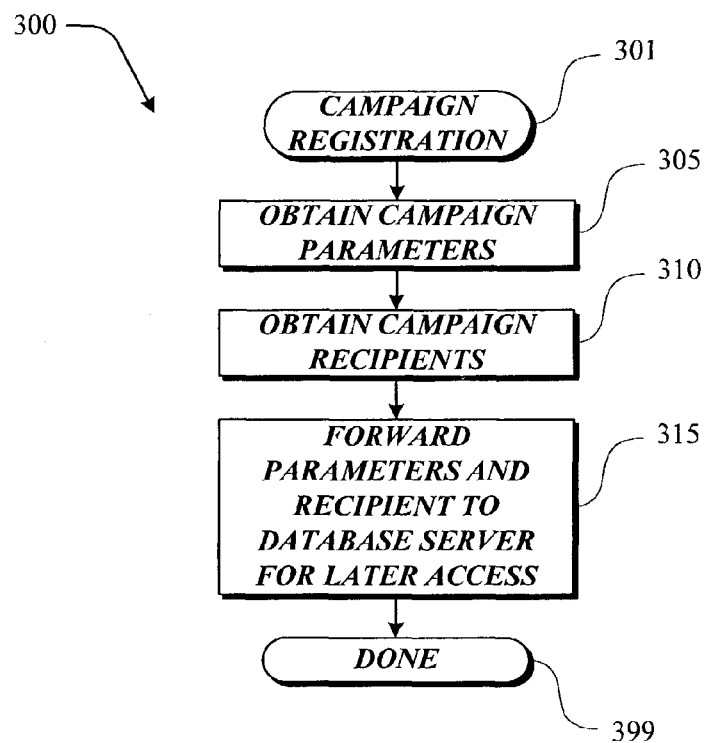
FIG. 3 is a functional flow diagram illustrating an exemplary campaign registration routine implemented by a registration server to register messaging campaigns in accordance with the present invention.

Returning now to the drawings, FIG. 3 is a functional flow diagram illustrating a campaign registration routine 300. As will be understood from the above overview and the following description, the registration routine 300 is used by the registration server 130 to register campaigns into the campaign sending system of the present invention.

Campaign registration routine 300 begins at block 301 and proceeds to block 305 where campaign parameters are obtained (e.g., manually from a campaign operator or automatically from a database). The campaign parameters are those pieces of information used to form the campaign message by specifying a message template, the contents of the template (e.g., look, language, product information), and any defining parameters of the campaign (e.g., recipients, duration). In one exemplary embodiment of the present invention, campaign parameters used in registering campaigns include a campaign type which corresponds to a particular message template. Campaign parameters may also include an inventory number for a piece of merchandise that may be used to populate a message template with relevant information for a campaign message. Similarly, campaign parameters may include a list of all recipients or a description of the type of recipient to which the campaign message is to be addressed. The above examples are not meant to limit in any manner the various types of information that may be included as parameters; they are merely provided to assist in understanding the present invention. Those of ordinary skill in the art and others will appreciate that many other variables may be included as campaign parameters.

Once the campaign parameters have been obtained, a list of potentially eligible recipients for the campaign being registered is obtained (e.g., manually from a campaign operator or automatically from a database) in a block 310. The choice of which recipients are eligible to receive the campaign is based on the characteristics of individuals stored in a database and on the nature of the campaign. The characteristics may be demographic characteristics (such as age, sex, income), or marketing characteristics (such as a prior purchase of a similar type product), for example. Then, at block 315, the parameters and recipients' identities are forwarded to the database server 200 for later access by the planner server when processing campaigns. After the parameters and recipients' identities have been forwarded, at block 399 the campaign registration routine 300 ends.

II. Testing and Scoring of Campaigns

It is a common complaint of customers that they receive too many messages, and, in particular, too many unsolicited marketing messages from retailers or other parties. If too many campaign messages are sent to recipients, the recipients are less likely to respond positively to the messages. Accordingly, the present invention includes an inbox manager server 120 that manages the number of messages sent to each recipient in a given time period. In one embodiment of the present invention, the number of campaign messages is set by the operator. For example, the operator may set a limit of "two messages during each calendar month" to limit the number of messages sent to the recipient. The message sending limit and period are stored as inbox data 270 by the inbox manager server 120. In an alternate embodiment, inbox manager server 120 provides controls that are exposed to recipients who set their own intervals for receiving campaign messages. For example, an account web page may be provided to a recipient with controls that allow the recipient to select the number of messages that the recipient would like to receive within a certain period. By limiting the number of unsolicited campaign messages the recipient receives, the recipients are less likely to become overburdened and more likely to respond positively to the periodic campaign messages they do receive. The recipient may respond in this fashion because the onslaught of messages has been reduced, or because infrequent messages will have more of an impact on the recipient—particularly as the present invention attempts to determine the best campaign to send to each recipient.

If the number of messages that can be sent to a recipient is limited, it is important that only the most valuable messages be sent. As a result, to determine the efficacy of any given campaign a campaign score is generated to indicate the relative value of a campaign and to allow comparison of one campaign with another. Based on the campaign score, the system can select the most valuable campaign or campaigns to send to the recipient, while not selecting less valuable campaigns. It will be appreciated that a number of different methods may be used to generate such a campaign score. For example, one technique would be to assign an average score to each new campaign and then measure the performance of the campaign over time (using the techniques disclosed herein) and modify the average score based on the subsequent performance of the campaign. Another technique of generating a campaign score would be to share a campaign score between all campaigns of the same campaign type. Yet another technique would be to assign a campaign score from a previously-existing campaign to a new campaign of the same campaign type, but to allow each of the campaign scores to vary independently based on the performance of each campaign.

Still another technique for generating a campaign score would be for each new campaign to undergo testing in order to generate a campaign score that is unique to that campaign. In order to do so, a "testing campaign" is created to send to a limited, but statistically significant (e.g., as determined using hypothesis testing), group of individuals. The group of recipients that participate in the testing campaign is selected from the recipients of the campaign that are eligible to receive messages within the current planning period (as defined below), i.e., recipients that are not already in the message plan and are eligible to receive messages according to their inbox data 270. Preferably, a minimum number of eligible recipients are selected to participate in the testing campaign. For a testing campaign the minimum number corresponds to a statistically large enough sampling of recipients to allow for statistically significant (e.g., with ±2% margin of error) analysis of metrics and scoring. Alternatively, testing campaigns may simply have a predetermined number (e.g., 50,000) of recipients designated to receive the testing campaign. Once the minimum number of recipients has been selected, a second group of unselected recipients from the campaign's recipients is placed in a control group. It will be appreciated that with testing campaigns there is an added incentive to get a more accurate evaluation of campaign metrics and the size of the control group may therefore be increased accordingly to assure a statistically large enough sampling Once the testing group and control group are selected, the testing campaign messages are added to the message plan and sent to recipients in the testing group as part of the processing of the message plan.

The resulting activities of recipients who receive the testing campaign messages are tracked to generate raw metrics data indicative of the recipients' behavior. Raw metrics data may take a number of forms. For example, the raw metrics data may include data representing the subsequent purchasing behavior of recipients following the receipt of messages describing a particular product, promotion, or service. The data about purchasing behavior is gathered by tracking the visit of the recipient to a web site to which the recipient has been referred, includes the purchase of other products, promotions, or services that are not explicitly referenced in the received campaign message. In another example, the raw metrics data may indicate the number of recipients that merely viewed additional details about a product, promotion, or service on the website to which a recipient is referred. The data about a recipient's viewing behavior may be gathered by analyzing the query logs of the website that the recipient is referred to by the testing message. Those of ordinary skill in the art and will appreciate that other metrics information may be generated that pertains to the user's visit to a website that the user is referred to as a result of the testing message. All raw metrics data is stored as performance data 285 in the database server 200.

Figure 4:
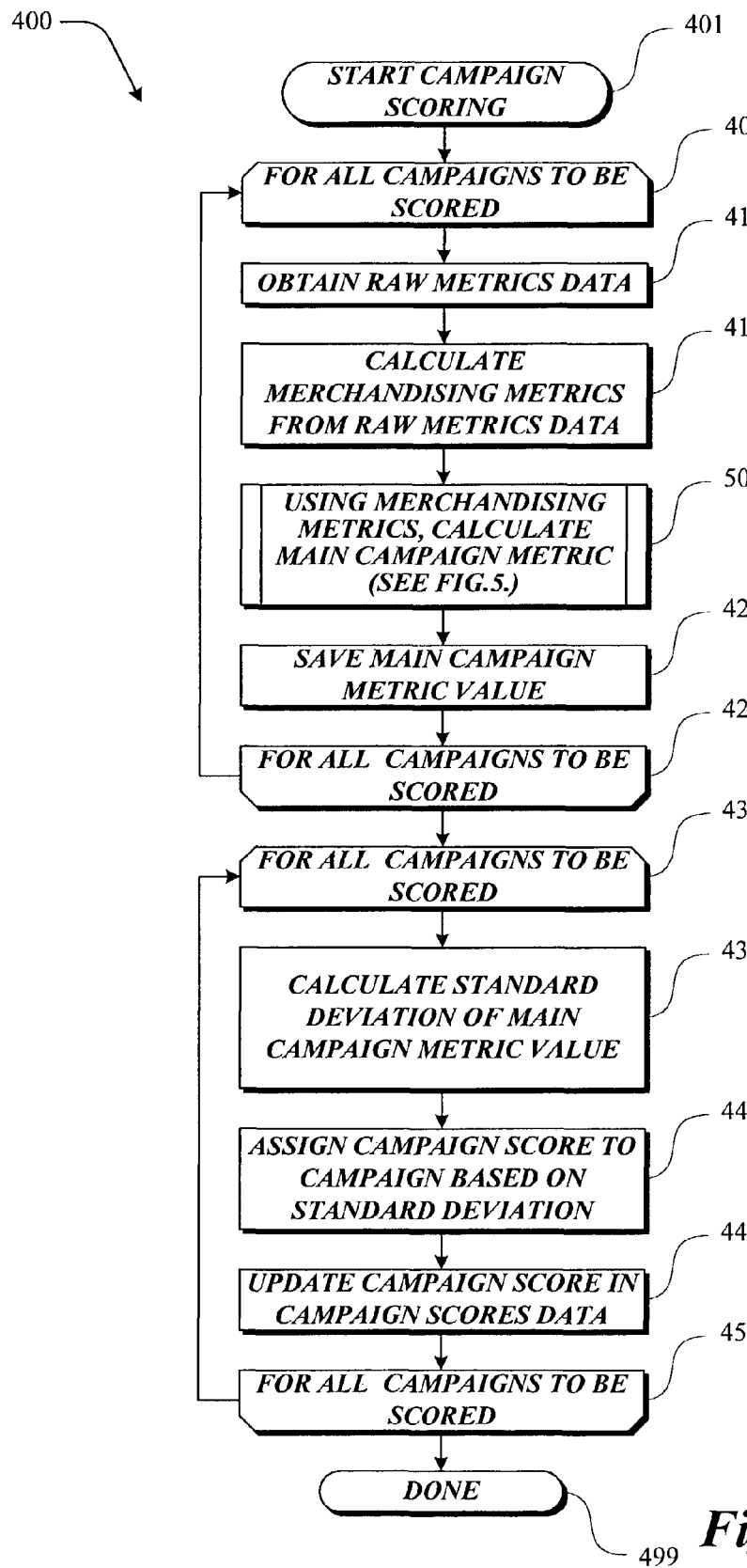
FIG. 4 is a functional flow diagram illustrating a campaign score routine suitable for use in the present invention.

After the raw metrics data pertaining to the activity of the testing group has been recorded, the raw metrics data is processed to determine the effectiveness of the campaign. FIG. 4 is a functional flow diagram illustrating metrics analysis performed by a campaign scoring routine 400 formed in accordance with the invention and processed by a metrics server 135. As will be better understood from the following description, the campaign scoring routine 400 is used to analyze the raw metrics data to generate campaign scores for campaigns.

Campaign scoring routine 400 begins at block 401 and proceeds to looping block 505, where an iteration through each campaign to be scored begins. At block 410, the raw metrics data is retrieved from storage. In this example, the raw metrics data is obtained from the performance data 285. Processing then proceeds to block 415 where merchandising metrics are calculated from the raw metrics data. In one exemplary embodiment, the merchandising metrics that are calculated include the following:

"DPM" is a calculation of the revenue received by a campaign on a per campaign message basis (i.e., revenue/message count).

"PPM" is the number of purchases per message (i.e., purchases/message count).

"PPMT" is the purchases per message for the members of the control group and the recipients who received the campaign message.

"DPP" is a representation of the average revenue received per purchase by recipients who received the campaign message.

"DPPT" is the average revenue per purchase for the members of the control group and the recipients who received the campaign message.

Those of ordinary skill in the art will appreciate that in other non-retail examples of the present invention the merchandising metrics may take forms other than the retail metrics model illustrated in FIG. 5 and described below. Thus, it is to be understood that the following described retail metrics model is to be taken as exemplary and not limiting. It is merely used to show one exemplary way of many ways of analyzing and processing metrics.

After block 415, processing proceeds to block 500 where, using the merchandising metrics, a main campaign metric value is calculated. An example of a suitable main campaign metric calculating subroutine 500 is illustrated in FIG. 5 and described below. After the main campaign metric calculating subroutine 500 returns, processing proceeds to block 420 where the main campaign metric value is saved. Next, in loopback block 425 processing cycles back to looping block 405 unless all campaigns to be scored have been iterated through.

After all campaigns to be scored have been iterated through, processing proceeds from loopback block 425 to looping block 430 where a new loop for all campaigns to be scored begins. The first step in the new loop is shown in block 435 where the standard deviation of the main campaign metric value of the current campaign to be scored is calculated in relation to all other campaigns with campaign scores. Processing then proceeds to block 440 where a campaign score is assigned to the current campaign based on the standard deviation of the current campaign's main campaign metric value. In one exemplary non-limiting embodiment of the present invention the campaign score is set as an integer value between 0 and 5. In this example, assigning a campaign score to a campaign based on its main campaign metric standard deviation comprises:

- If the main campaign metric value is more than two standard deviations less than an average main campaign metric value (where the average is of all campaigns to be scored), the campaign score is set to 0.
- If the main campaign metric value is between one and two standard deviations less than the average main campaign metric value, the campaign score is set as 1.
- If the main campaign metric value is less than one standard deviation below average but is still below the average main campaign metric value, then the campaign score is set to 2.
- If the main campaign metric value is less than one standard deviation greater than the average main campaign metric value but is still greater than the average main campaign metric value the campaign score is set to 3.
- If the main campaign metric value is between one and two standard deviations greater than the average main campaign metric value, then the campaign score is set to 4.
- If the main campaign metric value is greater than two standard deviations than the average main campaign metric value, then the campaign score is set to 5.

The above example is provided for illustrative purposes only. Those of ordinary skill in the art and others will appreciate that other values and other ranges may be used without departing from the spirit and scope of the present invention.

Routine 400 then proceeds to block 445 where the campaign score is updated in the campaign score data 280. As already noted above, in one exemplary embodiment individual campaigns have individual campaign scores. However, in an alternate embodiment, campaigns of the same type share a single campaign score. Those of ordinary skill in the art and others will appreciate that as metrics are determined for campaigns of the same type, the campaign scores and/or the main campaign metrics may be combined so as to produce a combined campaign score for the campaign type. Processing then proceeds to loopback block 450 which cycles back to looping block 430. Processing continues until all campaigns to be scored have been iterated through. After all campaigns to be scored have been iterated through, processing proceeds to block 499 where the campaign scoring routine 400 ends.

Figure 5:
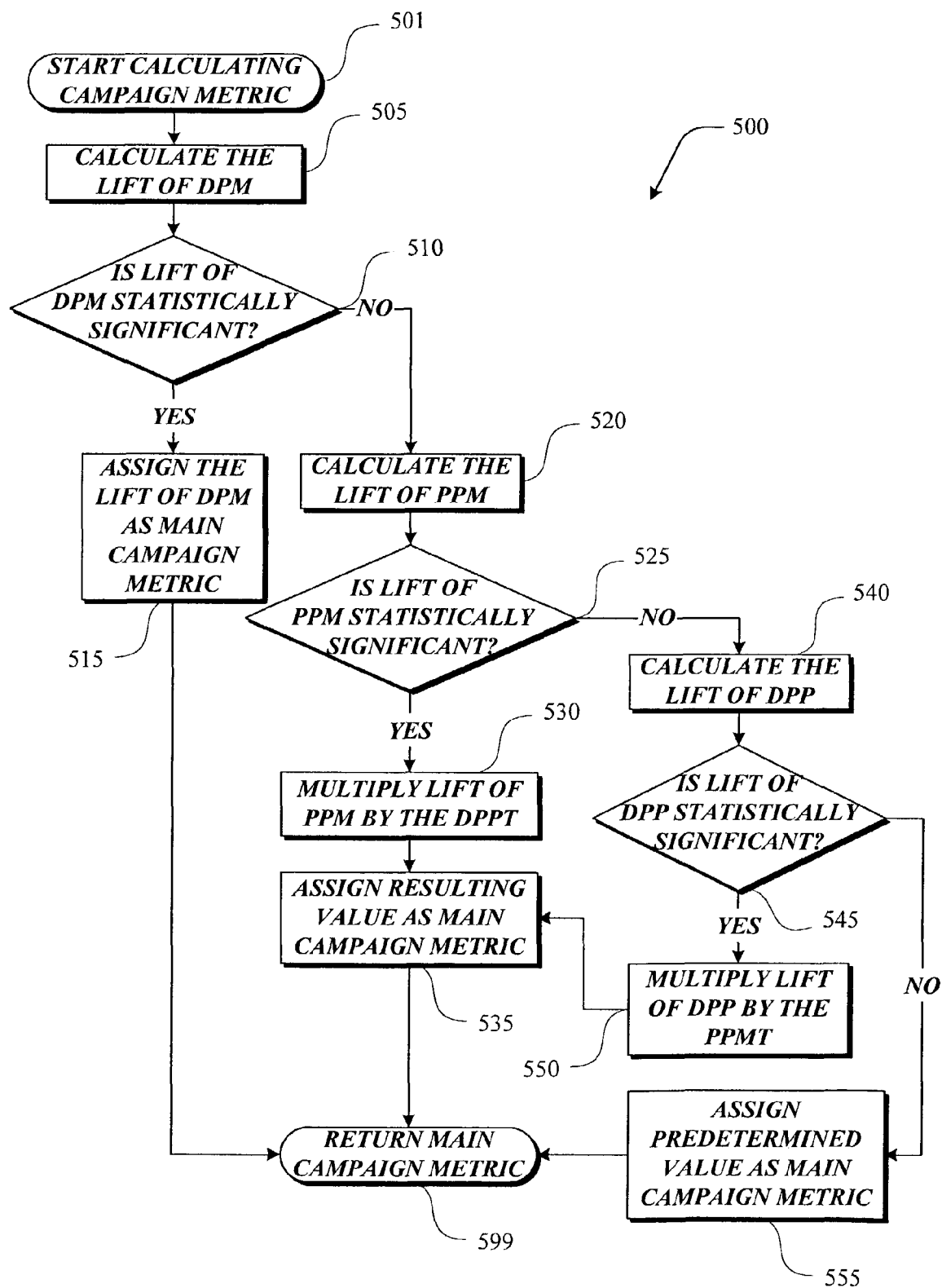
FIG. 5 is a functional flow diagram illustrating a metrics processing subroutine suitable for use in FIG. 4.

FIG. 5 is a functional flow diagram illustrating calculating performed by the campaign metric calculating subroutine 500 running on the metrics server 135. As noted above, the campaign metric calculating subroutine 500 is used to calculate a main campaign metric value for later use in determining campaign scores. The campaign metric calculating subroutine 500 begins at block 501 and proceeds to block 505 where the "lift" of the DPM is calculated. The lift of the DPM is the difference between the DPM of the control group and the DPM of the recipients. Next in decision block 510 a determination is made whether the lift of the DPM is statistically significant. If it is determined in decision block 510 that the lift of the DPM is statistically significant, then processing proceeds to block 515 where the value of the lift of the DPM is assigned as the main campaign metric. Processing then proceeds to block 599 where the campaign metric calculating subroutine 500 ends and returns to its calling routine.

If (in decision block 510) it is determined that the lift of DPM is not statistically significant, then processing proceeds to block 520 where the lift of the PPM is calculated. The lift of the PPM is calculated by determining the difference between the PPM of the recipients and the purchases per member of the control group, i.e., the group that did not receive a campaign message. Next, in decision block 525, a determination is made whether the lift of the PPM is statistically significant. If in decision block 525 it is determined that the lift of the PPM is statistically significant, then processing proceeds to block 530 where the lift of the PPM is multiplied by the DPPT. Next, in block 535, the resulting value is assigned as the main campaign metric. Processing then proceeds to block 599.

If (in decision block 525) it is determined that the lift of the PPM is not statistically significant, then processing proceeds to block 540 where the lift of the DPP is calculated. The lift of the DPP is calculated by determining the difference between the DPP of recipients and the average revenue per purchase of members of the control group. Next, in decision block 545, a determination is made whether the lift of DPP is statistically significant. If statistically significant, then processing proceeds to block 550 where the lift of the DPP is multiplied by the PPMT. Processing then proceeds to block 535 and continues as noted above.

If, however, it is determined in decision block 545 that the lift of the DPP is not statistically significant, then processing proceeds to block 555 where a predetermined value is assigned as the main campaign metric. In one exemplary embodiment, where none of the DPM, PPM or DPP has been found to be statistically significant, the predetermined value is set as zero. Those of ordinary skill in the art and others will appreciate that the predetermined value assigned in block 555 may be any of a number of appropriate values. Processing then proceeds to block 599.

Although the testing of campaigns has been discussed in the context of a new campaign, it will be appreciated that the testing techniques and campaign score methodology disclosed herein can also be applied to existing or continuing campaigns. In this case, control groups are reserved when the campaign system processes merchandising campaigns that already have an associated campaign score (See FIG. 6 and description below). Preserving control groups in the merchandising campaigns makes it possible to continually update a campaign's metrics and therefore its campaign score. As a result, the campaign score of a particular campaign or campaign type may be automatically refined by the system over time as the performance of the campaign changes.

III. Processing and Sending Campaigns

Once campaigns have been registered and scored, the campaign sending system 100 is able to process and send active merchandising campaigns in accordance with the present invention. The operator of the campaign system is able to select a planning period that defines a period during which a number of campaign messages are to be sent. The planning period may be any predetermined period of time, e.g., an hour, a day, week, etc. Generally, the length of the planning period may depend on the number and frequency of new campaigns that are created by the operator. In an exemplary embodiment the range of the planning period is from one to 150 hours.

Once a planning period is defined, the system identifies active merchandising campaigns associated with that planning period. Active merchandising campaigns have (1) a date parameter extending within the current planning period; and (2) a campaign score above a threshold (e.g., greater than "1" in the exemplary scoring values described above).

Figure 6:
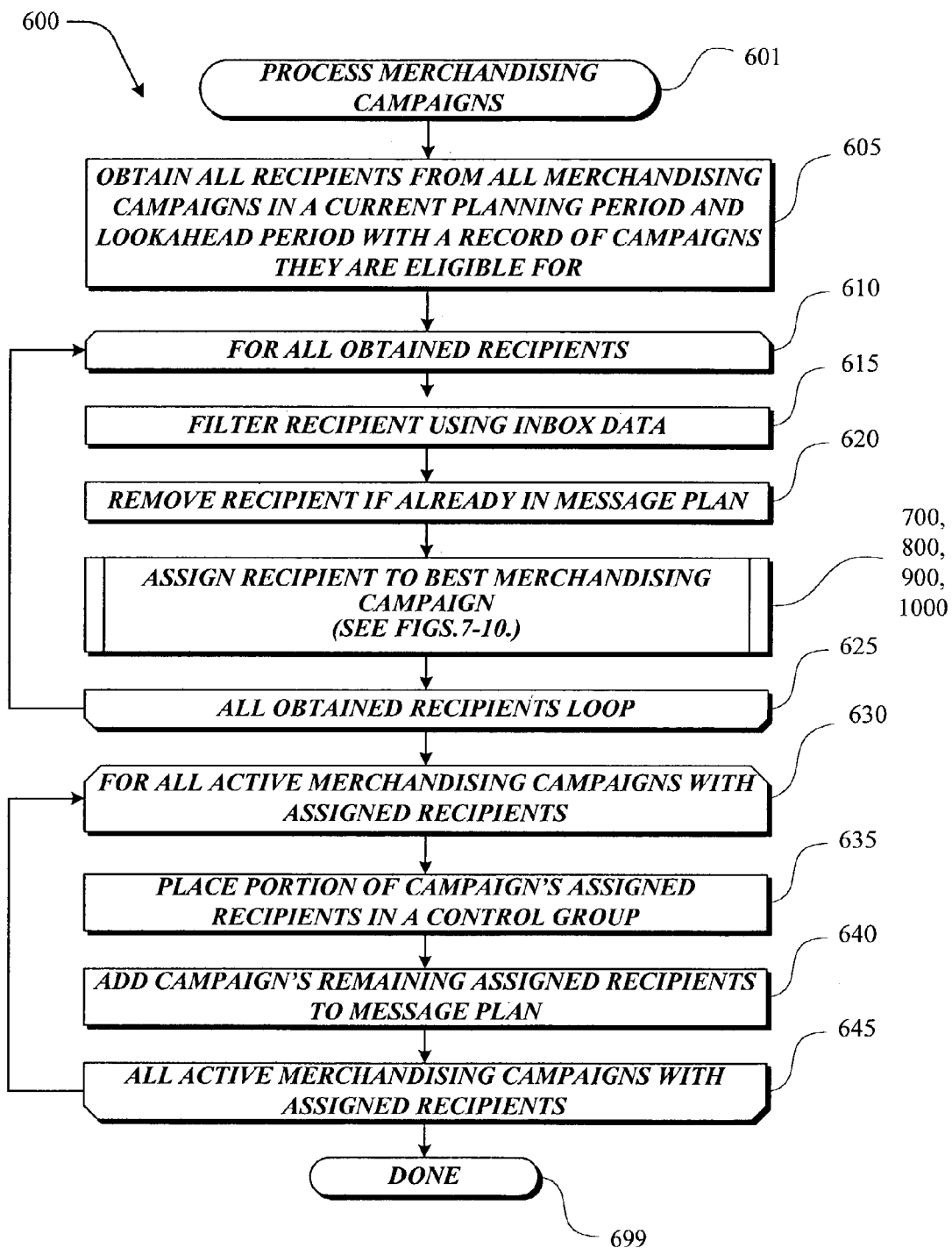
FIG. 6 is a functional flow diagram illustrating a merchandising campaigns sending routine suitable for use in the present invention.

FIG. 6 illustrates an exemplary merchandising campaign processing routine 600 that creates a message plan (as defined below) that identifies the recipients in active merchandising campaigns that should receive messages within the planning period. Merchandising campaigns processing routine 600 begins at block 601 and proceeds to block 605, where all recipients from all merchandising campaigns in a current planning period and a current lookahead period are obtained, each with a record of the campaigns for which they are eligible.

The lookahead period is an arbitrarily determined amount of time after the current planning period that the present invention "looks ahead" when evaluating which campaigns a recipient should be assigned to. The lookahead period is designed to look forward in time to see if there isn't a campaign in the future (i.e., after the planning period) that it would be more advantageous to assign the recipient to. A weight may be applied to the campaign score of future campaigns to discount the value of the campaign. If the discounted value of the future campaign exceeds the perceived value of a campaign within the planning period, then the system may opt to defer placing a recipient into a campaign in the current planning period so that the recipient may be available for inclusion in future campaigns. The length of the lookahead period may vary depending on the discounting method applied to campaign scores for future campaigns. As will be better understood from the following description, the lookahead period allows recipients to be better matched with campaigns.

Between looping block 610 and loopback block 625, the routine iterates through each recipient obtained from campaigns in the planning period and the lookahead period. At block 615 the recipient is removed from consideration if the inbox data 270 indicates that they are currently unavailable to receive a merchandising campaign message (e.g., the recipient's inbox data indicates they are currently ineligible to receive a message). At block 620, the recipient is also removed from consideration if the recipient is already in the current message plan (i.e., they have already been selected to receive a campaign message during the planning period).

The current recipient is then assigned to the "best" merchandising campaign utilizing a recipient assignment subroutine. FIGS. 7-10 illustrate exemplary and alternative recipient assignment subroutines 700, 800, 900 and 1000, respectively. One skilled in the art will appreciate that one of the assignment subroutines may be selected for use by the system depending on the number, frequency, length of campaigns, or other factor determined by the operator. After one of these recipient assignment subroutines returns, processing proceeds to loopback block 625 which cycles back to looping block 610 until all obtained recipients for campaigns in the planning period and lookahead period have been iterated through. The result is a group of recipients eligible for assignment to campaigns in the planning period (the "assigned recipients").

After all obtained recipients have been iterated through, processing proceeds to looping block 630, which iterates through each active merchandising campaign having assigned recipients. Next, in the loop, processing proceeds to block 635 where a portion of the assigned recipients for each active merchandising campaign are placed into a control group for purposes of continuing to test and update the campaign score associated with a campaign. Processing then proceeds to block 640 where the remaining assigned recipients for each active merchandising campaign are assigned to the current planning period's message plan 265. A message plan is the aggregation of all campaign messages that are to be sent during the current planning period. When completed for the current planning period, the message plan is sent to a sender server 115 which uses the message plan to automatically schedule and send all campaign messages during that planning period.

Next, routine 600 proceeds to loopback block 645 which cycles back to looping block 630 unless all campaigns that have assigned recipients have been iterated through. If all campaigns that have assigned recipients have been iterated through, processing proceeds to block 699 where the campaign processing routine 600 ends.

Figure 7:
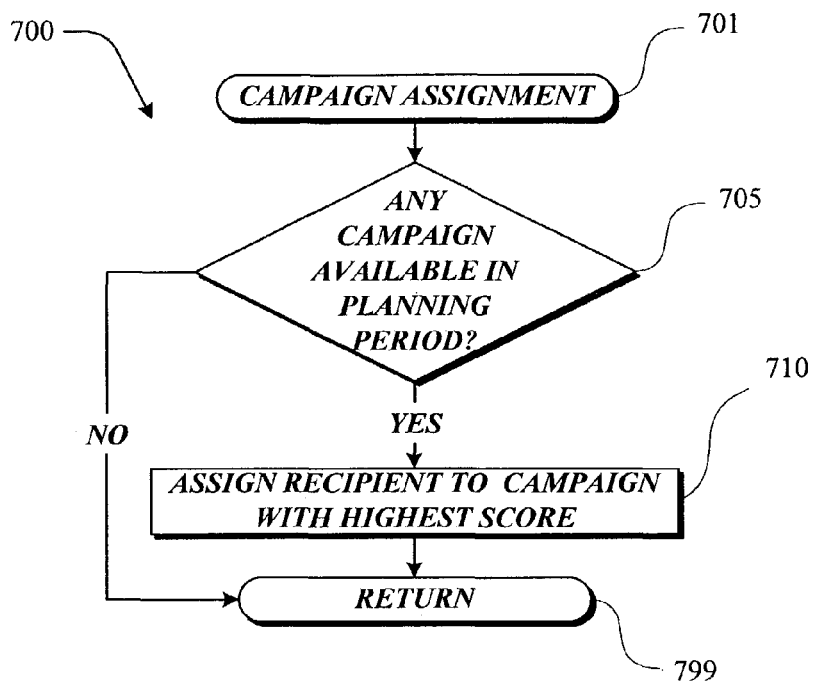
FIGS. 7-10 are functional flow diagrams illustrating alternate campaign assignment subroutines suitable for use in FIG. 6.

FIG. 7 illustrates an exemplary campaign assignment subroutine 700 suitable for assigning a recipient to a campaign when campaigns in the lookahead period are not considered. The illustrated campaign assignment subroutine 700 begins at block 701 and proceeds to decision block 705 where a determination is made whether any campaign is available to the recipient in the planning period. If it is found that one or more campaigns are available in the planning period, processing proceeds to block 710 where the recipient is assigned to the campaign with the highest campaign score. Processing then proceeds to block 799. If, however, in decision block 705 it was determined that no campaign is available to the recipient in the planning period, then processing proceeds directly to block 799 without assigning a campaign. At block 799 subroutine 700 ends and returns to the calling routine.

Figure 8:
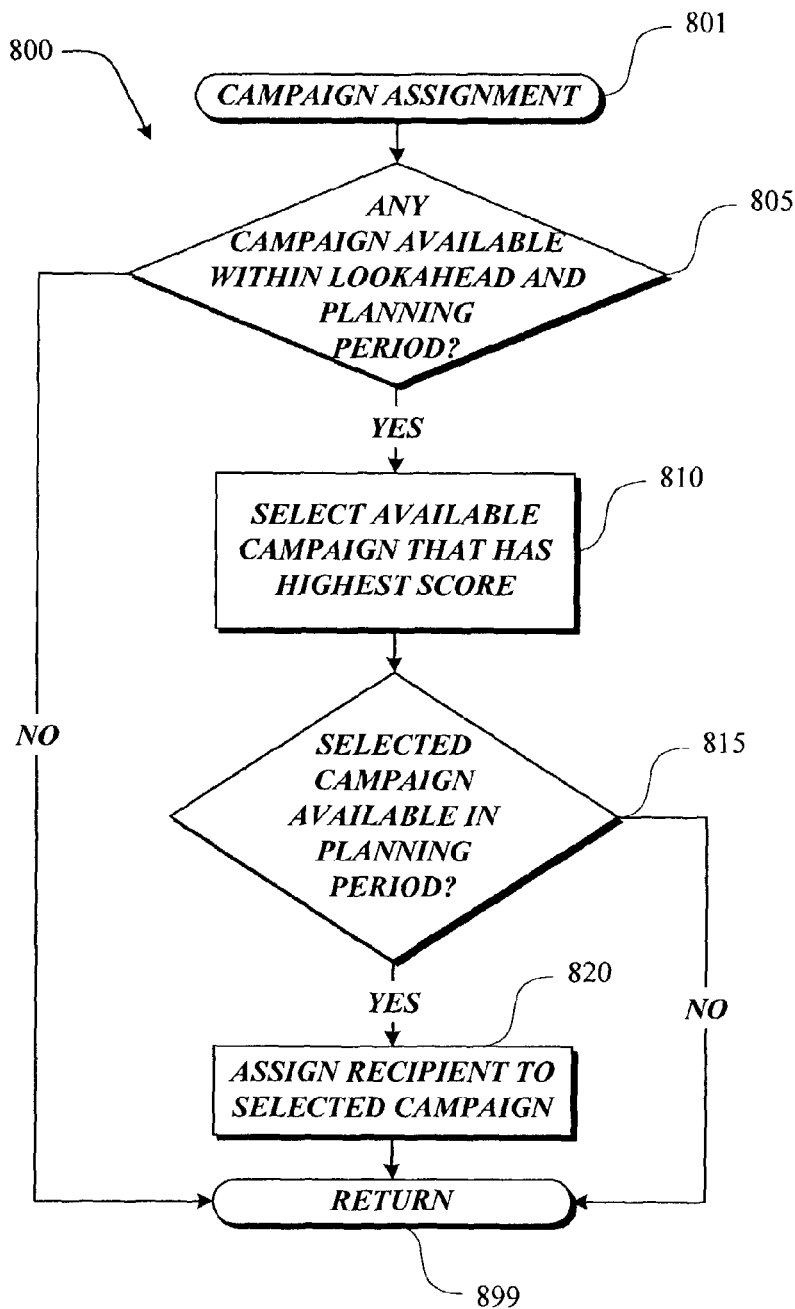

FIG. 8 illustrates an alternate campaign assignment subroutine 800 suitable for assigning a recipient to a campaign when campaigns in the lookahead period are considered. The illustrated campaign assignment subroutine 800 begins at block 801 and proceeds to decision block 805 where a determination is made whether any campaign within the planning period and lookahead period is available to the recipient. If it is determined that one or more campaigns is available to the recipient within the planning period and lookahead period, then processing proceeds to block 810 where the campaign with the highest campaign score is selected. Processing then proceeds to decision block 815 where a determination is made whether the selected campaign is available within the planning period. If it was determined that the selected campaign is available within the planning period, then processing proceeds to block 820 where the recipient is assigned to the selected campaign. Processing then proceeds to block 899 where the campaign assignment subroutine 800 ends, and returns to the calling routine. If, however, in decision block 815 it is determined that the selected campaign is not available within the planning period, then processing proceeds directly to block 899 (without assigning the recipient to any campaign). Similarly, if in decision block 805 it was determined that no campaign was available within the planning period or lookahead period, then processing proceeds directly to block 899 as well.

Figure 9:
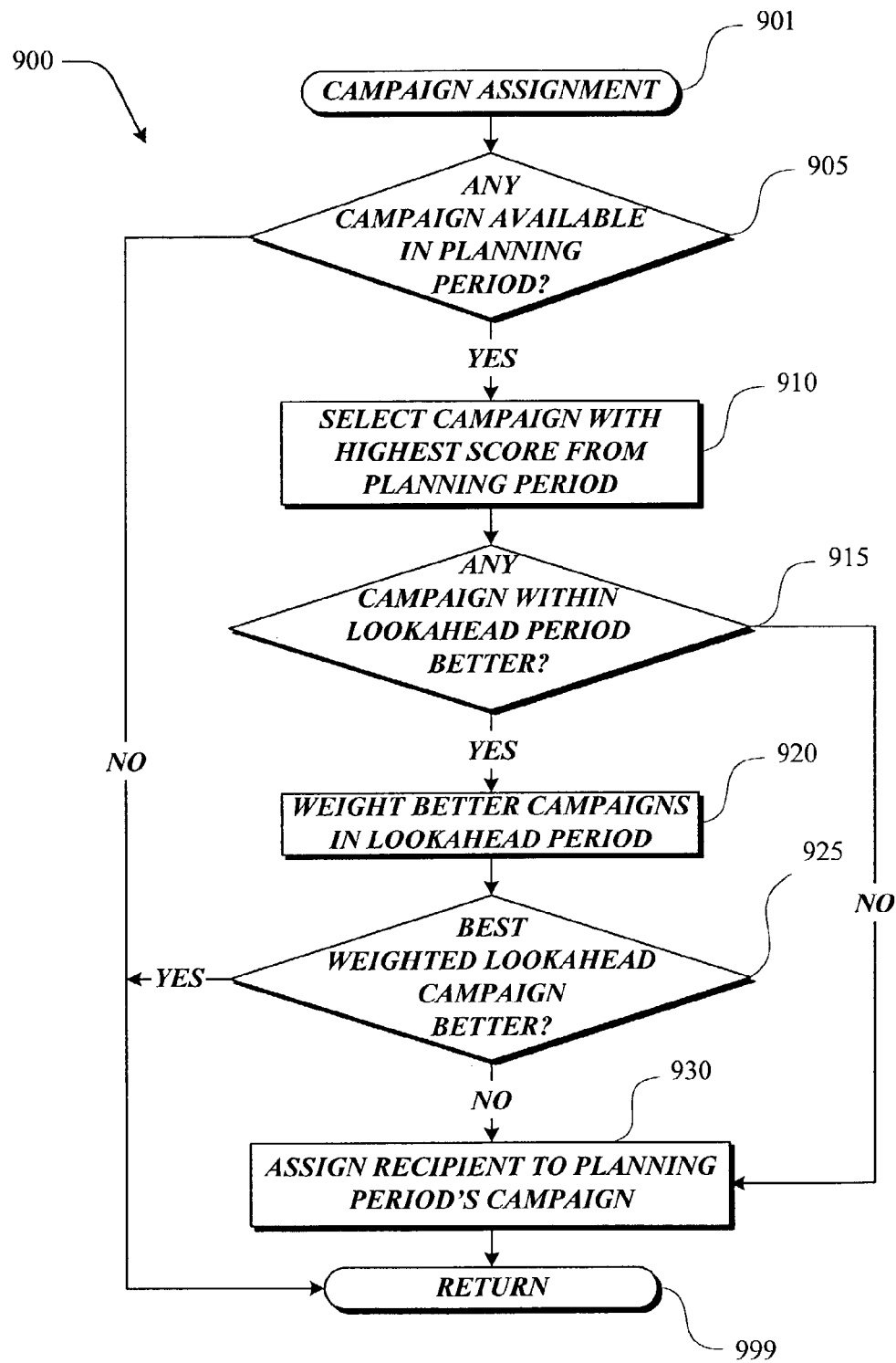

FIG. 9 illustrates another alternate campaign assignment subroutine 900 suitable for assigning recipients to a campaign usable where the lookahead period is considered and the campaign scores of campaigns within the lookahead period are weighted. The illustrated campaign assignment subroutine 900 begins at block 901 and proceeds to block 905 where a determination is made whether any campaign is available in the planning period to which the recipient can be assigned, i.e., for which the recipient is eligible. If it is found that a campaign is available, then processing proceeds to block 910 where the campaign with the highest campaign score for the planning period to which the recipient can be assigned is selected. Next, in decision block 915 a determination is made whether any campaign within the lookahead period to which the recipient can be assigned has a higher campaign score. If there is a campaign within the lookahead period that has a higher campaign score, then processing proceeds to block 920 where all future campaigns that are better are weighted.

Those of ordinary skill in the art and others will appreciate that a myriad of weighting schemes may be used to adjust the values of future campaign scores in the lookahead period. In one exemplary embodiment, the weighting in a scoring range of 0 to 5 has a discount of half a point per day starting from the first day of the lookahead period when the lookahead period is 10 days. Accordingly, a campaign at the eighth day of the lookahead period with a maximum score of 5 would have a weighted score of 1[5−(8×0.5)=1]. This example is merely provided as an illustration and is not meant to be limiting.

Processing then proceeds to decision block 925 where a determination is made whether the best weighted future campaign to which the recipient can be assigned is better than the selected campaign. If not, then processing proceeds to block 930 where the recipient is assigned to the selected campaign. If in decision block 915 no campaign within the lookahead period was found, processing also proceeds to block 930. After block 930, processing proceeds to block 999 where subroutine 900 ends, and returns to the calling routine. In decision block 925, if the best weighted future campaign is better than the selected campaign, processing also proceeds to block 999. In decision block 905, if no campaign to which the recipient can be assigned is available in the planning period, processing also proceeds to block 999.

Figure 10:
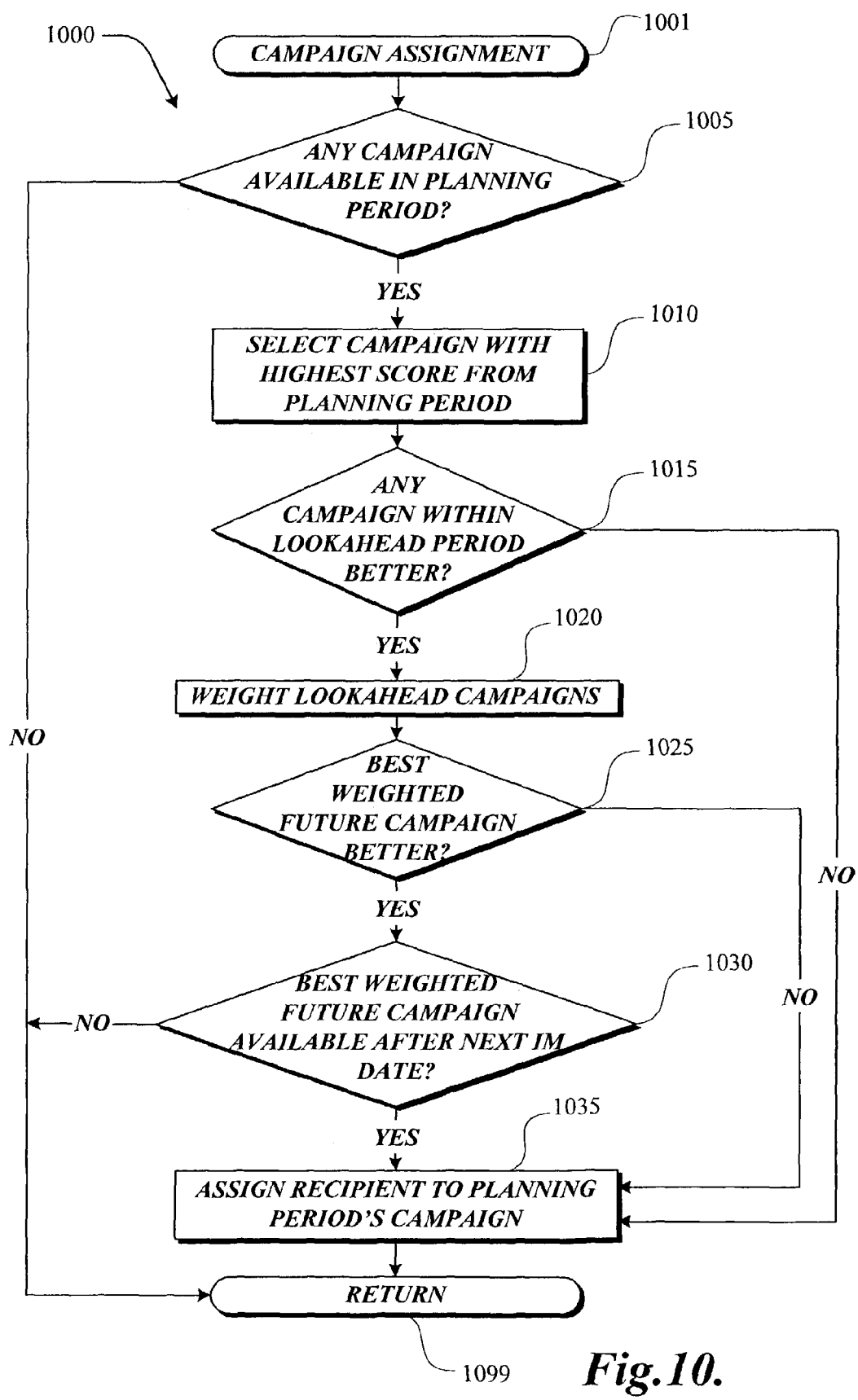

FIG. 10 illustrates another alternate campaign assignment subroutine 1000 suitable for assigning recipients to a campaign usable where the lookahead period is considered, the campaign scores of campaigns within the lookahead period are weighted, and a further test of the inbox data 270 is preformed. The illustrated campaign assignment subroutine 1000 begins at block 1001 and proceeds to block 1005 where a determination is made whether any campaign to which the recipient can be assigned, i.e., is eligible, is available in the planning period. If it is found that a campaign is available in the planning period, then processing proceeds to block 1010 where the campaign with the highest score in the planning period is selected. Next, in decision block 1015 a determination is made whether any campaign within the lookahead period to which the recipient can be assigned is better, i.e., has a higher score. If there is a campaign within the lookahead period that is better, then processing proceeds to block 1020 where future campaigns that are better are weighted. As discussed above with respect to FIG. 9, those of ordinary skill in the art and others will appreciate that a myriad of weighting schemes may be used to adjust the values of future campaign scores in the lookahead period. Processing then proceeds to decision block 1025 where a determination is made whether the best weighted future campaign is better than the selected campaign. If not, then processing proceeds to block 1035 where the recipient is assigned to the selected campaign. If (in decision block 1025) it was determined that the best weighted campaign in the future is better than the selected campaign, then processing proceeds to decision block 1030. In decision block 1030 a determination is made whether the best weighted campaign in the future is available after the next date during which the recipient can receive mail in accordance with the inbox data 270 (the inbox manager date/period or "IM date"). If so, then processing proceeds to block 1035 where the recipient is assigned to the selected campaign. Similarly, if in decision block 1015 no campaign within the lookahead period is better than the selected campaign, then processing also proceeds to block 1035. After block 1035, processing proceeds to block 1099 where subroutine 1000 ends, and returns to the calling routine. In decision block 1005, if no campaign is available today, processing also proceeds to block 1099. If, however, the best weighted campaign in the future is not available on or after the IM date, then processing proceeds directly to block 1099.

Those skilled in the art will appreciate that the assignment subroutines of FIGS. 7-10 may also be used to assign recipients to campaigns associated with planning periods that are after the current planning period. That is, recipients may be assigned to campaigns that are associated with the next-available date that the recipient is eligible to receive a message as represented by their inbox data 270 (i.e., the planning period is set to the next-available date). The effect of assigning a recipient to a future message campaign is to remove the recipient from consideration for assignment to campaigns during any planning periods that occur prior to the future campaign.

IV. Campaign Performance

Figure 11:
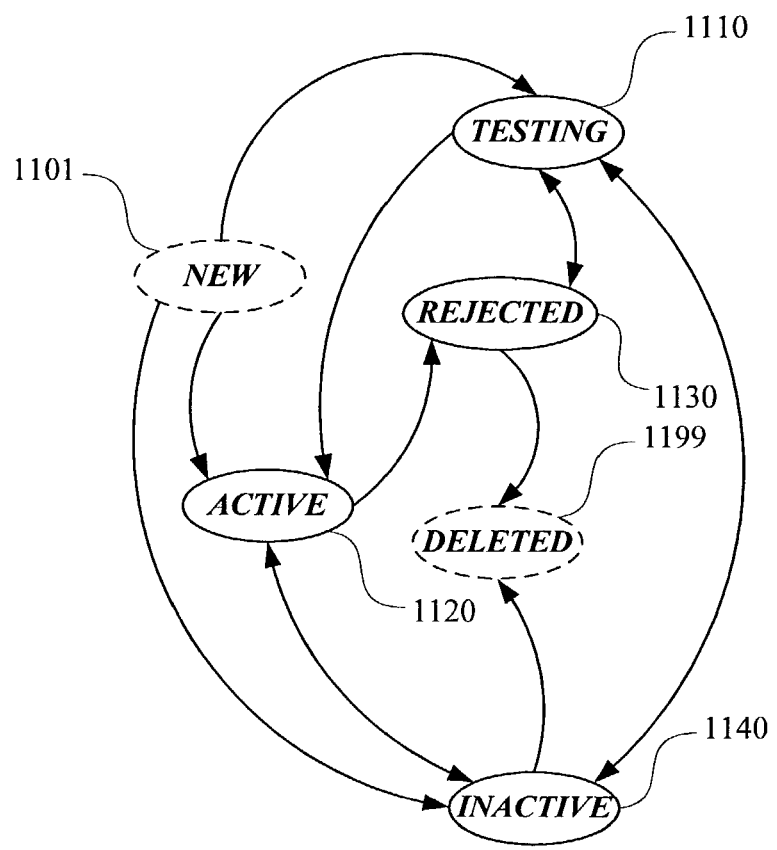
FIG. 11 is a state diagram illustrating possible states that campaigns may have in accordance with the present invention.

Discretionary campaigns of the present invention may change their status during the course of their existence as a result of their campaign scores or campaign parameters. FIG. 11 is a state diagram that illustrates the possible states for discretionary campaigns. New campaigns 1101 are those campaigns that have just been registered. Accordingly, as shown in FIG. 11, new campaigns 1101 can progress to become one of three states:

Testing 1110, if the campaign does not yet have a campaign score, but has a date parameter indicating that the campaign can be sent during the current planning period.

Active 1120, if the campaign has a campaign score above a selected threshold and a date parameter indicating that the campaign can be sent during the current planning period.

Inactive 1140, if the campaign is not eligible to be sent in the current planning period.

Campaigns, once tested for a campaign score in the testing 1110 state, move into one of three states:

Rejected 1130, if the campaign's score is lower than a predetermined acceptable threshold.

Active 1120, if the campaign has a campaign score above a selected threshold and a date parameter indicating that the campaign can be sent during the current planning period.

Inactive 1140, if the campaign is not eligible to be sent in the current planning period.

Active campaigns 1120 can change to one of the following states:

Rejected 1130, if the campaign's score drops below a predetermined acceptable threshold based on periodic testing of the campaign.

Inactive 1140, if the campaign is not eligible to be sent in the current planning period.

Inactive campaigns 1140 can change to the following states:
  Testing 1110, if the campaign was waiting to be turned on during the current planning period and a score for the campaign is still unknown.
  Active 1120, if the campaign has a campaign score above a selected threshold and a date parameter indicating that the campaign can be sent during the current planning period.
  Deleted 1199, if a decision is made that the campaign is no longer desired.

Rejected campaigns 1130 can change to the following states:
  Testing 1110, if the campaign receives an indication (e.g., from an operator) that it should be retested.
  Deleted 1199, if a decision is made that the campaign is no longer desired.

As can be seen from the above description of status changes for discretionary campaigns in the campaign sending system 100 of the present invention, little or no operator intervention is required when handling different phases of a campaign. After a campaign is registered, a campaign score is automatically assigned (either through testing or through another method). Campaign messages are automatically populated into a message plan and the message plan is used to automatically send messages to the recipients. Campaign messages to individual recipients are controlled such that the recipient only receives the most valuable message within a certain timeframe. The performance of campaigns is monitored, and the campaign scores are adjusted based on the actions taken by recipients subsequent to receiving the campaign message. No operator intervention is required except when manually-adjusting campaigns.

While the presently preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A computer-implemented method for automatically sending a campaign message to a recipient at a recipient computer, comprising:
  determining, by a sender server, that the recipient is eligible to receive a campaign message corresponding to an active campaign;
  obtaining a campaign score for the active campaign based on a measured performance of the active campaign over time, wherein the measured performance is derived from consideration of both a revenue received by the active campaign on a per campaign message basis and a number of purchases per campaign message, wherein each campaign message of the active campaign has been sent to a plurality of recipients;
  determining that said campaign score for the active campaign is the highest among campaign scores for active campaigns from which the recipient is eligible to receive campaign messages; and
  automatically selecting and sending, by the sender server, a campaign message corresponding to the active campaign to the recipient computer.

2. The method of claim 1, wherein the campaign score is further calculated based on a standard deviation of the measured performance.

3. The method of claim 1, wherein obtaining a campaign score for an active campaign further comprises:
  identifying a test group of eligible recipients who will receive messages corresponding to a testing campaign;
  identifying a control group of eligible recipients who will not receive the messages corresponding to the testing campaign;
  sending the messages corresponding to the testing campaign to the test group;
  comparing behavior of the test group who has received the messages corresponding to the testing campaign to behavior of the control group who has not received the messages corresponding to the testing campaign; and
  updating the campaign score based on the comparison.

4. The method of claim 3, wherein behavior of the test group comprises data representing purchasing patterns of each recipient following receipt of the messages corresponding to the testing campaign, the data comprising tracking information resulting from each recipient's activity on a web site identified by the messages corresponding to the testing campaign, the activity including purchasing products available via the identified web site.

5. The method of claim 1, wherein said campaign messages are selected from a group consisting of electronic mail messages, short message service messages, WAP messages, instant messenger messages, and audio messages.

6. A computer-implemented method implemented by a sender server communicatively coupled to a recipient computer over a computer network for automatically sending a campaign message to a recipient at the recipient computer, the method comprising:
  determining with the sender server that said recipient is eligible to receive campaign messages corresponding to an active campaign, wherein determining whether said recipient is eligible comprises checking whether a characteristic of said recipient is within desired limits associated with the active campaign;
  obtaining a campaign score for the active campaign, wherein the campaign score is calculated based on a standard deviation of a campaign metric value, the campaign metric value being derived from consideration of both a revenue received by the active campaign on a per campaign message basis and a number of purchases per campaign message, wherein each campaign message of the active campaign has been sent to a plurality of recipients;
  determining that said campaign score for the active campaign is the highest among campaign scores for active campaigns from which the recipient is eligible to receive campaign messages; and
  automatically selecting and sending, by the sender server, a campaign message corresponding to said active campaign to said recipient computer.

7. The method of claim 6, wherein obtaining a campaign score for an active campaign comprises:
  setting said campaign score for the active campaign to an average score; and
  updating said campaign score based on subsequent performance of said active campaign.

8. The method of claim 6, wherein obtaining a campaign score for an active campaign comprises:
  setting said campaign score for the active campaign to the campaign score of at least one other campaign of similar type; and
  updating said campaign score based on subsequent performance of said active campaign.

9. The method of claim 6, wherein obtaining a campaign score for an active campaign comprises:
   combining campaign scores for a plurality of campaigns; and
   updating said campaign score based on subsequent performance of said plurality of campaigns.

10. The method of claim 6, wherein obtaining a campaign score for an active campaign comprises:
   identifying a test group of eligible recipients who will receive messages corresponding to a testing campaign;
   identifying a control group of eligible recipients who will not receive the messages corresponding to the testing campaign;
   sending the messages corresponding to the testing campaign to said test group;
   comparing behavior of said test group who has received the messages corresponding to the testing campaign to behavior of the control group who has not received the messages corresponding to the testing campaign; and
   updating said campaign score based on said comparison.

11. The method of claim 6, wherein no more than a predetermined number of campaign messages are selected to be sent to said recipient.

12. The method of claim 6, wherein no more than a predetermined number of campaign messages are selected to be sent to said recipient in a period of time.

13. The method of claim 6, wherein the campaign message selected to be sent is sent only during a predetermined time period.

14. The method of claim 6, wherein said campaign messages are selected from a group consisting of electronic mail messages, short message service messages, WAP messages, instant messenger messages, and audio messages.

15. The computer-implemented method of claim 6, wherein the value of the active campaign includes a revenue resulting from the active campaign.

16. A computer-readable storage medium having computer-executable instructions which, when executed on a computer processor of a sender server cause the sender server to:
   determine that a recipient is eligible to receive campaign messages corresponding to an active campaign, wherein determining whether said recipient is eligible comprises checking by the sender server whether a characteristic of said recipient is within desired limits associated with the active campaign;
   obtain a campaign score for the active campaign, wherein obtaining a campaign score includes assigning by the sender server the campaign score based on a measured performance of the active campaign over time, the measured performance being derived from consideration of both a revenue received by the active campaign on a per campaign message basis and a number of purchases per campaign message, wherein each campaign message of the active campaign has been sent to a plurality of recipients;
   determine that said campaign score for the active campaign is the highest among campaign scores for active campaigns from which the recipient is eligible to receive campaign messages; and
   automatically select and send a campaign message related to said active campaign to a computer associated with said recipient.

17. A computer system for automatically selecting a campaign message to send to a recipient, the system comprising:
   a database for storing campaign messages; and
   a sender server in communication with said database, wherein the sender server is configured to:
      determine that a recipient is eligible to receive campaign messages corresponding to an active campaign, wherein determining whether said recipient is eligible comprises checking whether a characteristic of said recipient is within desired limits associated with the active campaign;
      obtain a campaign score for the active campaign, wherein the campaign score is calculated based on a standard deviation of a campaign metric value, the campaign metric value being derived from consideration of both a revenue received by the active campaign on a per campaign message basis and a number of purchases per campaign message, wherein each campaign message of the active campaign has been sent to a plurality of recipients;
      determine that said campaign score for the active campaign is the highest among campaign scores for active campaigns from which the recipient is eligible to receive campaign messages; and
      automatically select and send a campaign message corresponding to said active campaign to a computer associated with said recipient.

18. The system of claim 17, further comprising a registration server in communication with said sender server for registering said active campaign so that campaign messages from said active campaign may be selected for sending by said sender server.

19. The system of claim 17, further comprising an inbox manager server in communication with said sender server for regulating how often said recipient may receive campaign messages sent by said sender server.

20. The system of claim 17, further comprising a metrics server in communication with said sender server for measuring subsequent performance of said active campaign.

21. The system of claim 17, wherein the recipient's characteristic is a demographic characteristic of the recipient.

22. The system of claim 17, wherein the recipient's characteristic is a marketing characteristic associated with the recipient.

23. The system of claim 17, wherein said recipient's eligibility is determined by checking whether a plurality of recipient's characteristics are within desired limits associated with the active campaign.

24. The computer-readable medium of claim 16, wherein the recipient's characteristic is a demographic characteristic of the recipient.

25. The computer-readable medium of claim 16, wherein the recipient's characteristic is a marketing characteristic associated with the recipient.

26. The computer-readable medium of claim 16, wherein said recipient's eligibility is determined by checking whether a plurality of recipient's characteristics are within desired limits associated with the active campaign.

27. The method of claim 6, wherein the recipient's characteristic is a demographic characteristic of the recipient.

28. The method of claim 6, wherein the recipient's characteristic is a marketing characteristic associated with the recipient.

29. The method of claim 6, wherein said recipient's eligibility is determined by checking whether a plurality of recipient's characteristics are within desired limits associated with the active campaign.

30. The method of claim 10, wherein behavior of said test group comprises data representing purchasing patterns of each recipient following receipt of the messages corresponding to the testing campaign, the data comprising tracking information resulting from each recipient's activity on a web site identified by the messages corresponding to the testing campaign, the activity including purchasing products available via the identified web site.

31. The computer-readable storage medium of claim 16, wherein the measured performance of the active campaign over time includes a calculation of a revenue generated by the campaign on a per campaign message basis.

* * * * *